(12) United States Patent
McCormack et al.

(10) Patent No.: US 6,713,140 B2
(45) Date of Patent: Mar. 30, 2004

(54) LATENTLY DISPERSIBLE BARRIER COMPOSITE MATERIAL

(75) Inventors: Ann Louise McCormack, Cumming, GA (US); Richard Lee Shick, Aiken, SC (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 10/026,197

(22) Filed: Dec. 21, 2001

(65) Prior Publication Data

US 2003/0118850 A1 Jun. 26, 2003

(51) Int. Cl.[7] .................. B32B 27/08; B32B 27/10; B32B 27/30; B32B 27/36
(52) U.S. Cl. .................. 428/36.6; 428/34.2; 428/34.3; 428/35.7; 428/36.9; 428/480; 428/481; 428/483; 428/332; 428/339; 428/475.5; 428/500; 428/507; 428/511; 428/514; 428/522; 428/532; 428/533; 428/537.5; 442/394; 442/395; 442/396; 442/398
(58) Field of Search .................. 428/34.2, 34.3, 428/35.7, 36.6, 36.7, 36.9, 480, 481, 483, 500, 507, 511, 514, 522, 332, 339, 475.5, 532, 533, 537.5; 442/394, 395, 396, 398

(56) References Cited

U.S. PATENT DOCUMENTS

| | | |
|---|---|---|
| 2,169,834 A | 8/1939 | Englert |
| 2,671,906 A | 3/1954 | Potts |
| 3,066,315 A | 12/1962 | Huber |
| 3,115,644 A | 12/1963 | Bloodworth |
| 3,227,137 A | 1/1966 | Goldman et al. |
| 3,249,950 A | 5/1966 | Wilson |
| 3,263,241 A | 8/1966 | Saulson |
| 3,375,448 A | 3/1968 | Newman et al. ............ 328/42 |

(List continued on next page.)

FOREIGN PATENT DOCUMENTS

| | | |
|---|---|---|
| BE | 725320 | 5/1969 |
| CA | 774792 | 1/1968 |
| CA | 800204 | 12/1968 |
| CA | 801704 | 12/1968 |
| CA | 819353 | 8/1969 |

(List continued on next page.)

OTHER PUBLICATIONS

TAPPI Official Test Method T 494 om–88, "Tensile Breaking Properties Of Paper And Paperboard (Using Constant Rate Of Elongation Apparatus)," published by the TAPPI Press, Atlanta, Georgia, revised 1988, pp. 1–5.

*Primary Examiner*—Vivian Chen
(74) *Attorney, Agent, or Firm*—William D. Herrick

(57) ABSTRACT

The disclosure describes a latently dispersible barrier composite material including an exposed low strength barrier component, an internal water sensitive layer, and a water permeable, inextensible, water dispersible support layer. When exposed to aqueous conditions on the barrier side, the composite prevents it from passing through to the other layers. When exposed to aqueous conditions on the opposite side, the composite readily disperses and may be disposed of by flushing in a toilet, for example. Uses are many and include numerous containment applications such as commode liners, containers for bodily and animal wastes, components of personal care products and the like. Examples of barrier layers include polylactic acid. Examples of water sensitive layers include polyvinyl alcohol. Examples of support layers include low stretch grades of toilet tissue.

16 Claims, 1 Drawing Sheet

U.S. PATENT DOCUMENTS

| | | |
|---|---|---|
| 3,377,631 A | 4/1968 | Whitney |
| 3,418,663 A | 12/1968 | Scott |
| 3,475,767 A | 11/1969 | Friesen et al. |
| 3,484,874 A | 12/1969 | Bickenheuser, Jr. |
| 3,546,716 A | 12/1970 | Laumann ................... 4/112 |
| 3,591,870 A | 7/1971 | Friesen et al. |
| 3,605,128 A | 9/1971 | Oden et al. |
| 3,661,695 A | 5/1972 | Berliner |
| 3,763,502 A | 10/1973 | Laumann ................... 4/112 |
| 3,772,712 A | 11/1973 | Renn et al. |
| 3,777,317 A | 12/1973 | Hoborn |
| 3,797,734 A | 3/1974 | Fleury et al. |
| 3,800,797 A | 4/1974 | Tunc |
| 3,804,092 A | 4/1974 | Tunc ..................... 128/284 |
| 3,849,241 A | 11/1974 | Butin et al. ............ 161/169 |
| 3,859,125 A | 1/1975 | Miller et al. |
| 3,897,782 A | 8/1975 | Tunc |
| 3,906,555 A | 9/1975 | Scott et al. |
| 3,920,179 A | 11/1975 | Hall |
| 3,934,587 A | 1/1976 | Gordon |
| 3,936,890 A | 2/1976 | Oberstein |
| 3,942,196 A | 3/1976 | Mills |
| 3,950,578 A | 4/1976 | Laumann ................ 427/378 |
| 3,951,893 A | 4/1976 | Gander |
| 4,005,251 A | 1/1977 | Tunc |
| 4,011,606 A | 3/1977 | Scrafield et al. |
| 4,034,079 A | 7/1977 | Schoonman |
| 4,035,540 A | 7/1977 | Gander |
| 4,062,451 A | 12/1977 | Gander |
| 4,136,798 A | 1/1979 | Oberstein |
| D261,429 S | 10/1981 | Hanna-Burns |
| 4,314,558 A | 2/1982 | Korpman |
| 4,343,053 A | 8/1982 | O'Connor |
| 4,372,311 A | 2/1983 | Potts ..................... 128/287 |
| 4,375,448 A | 3/1983 | Appel et al. |
| 4,494,278 A | 1/1985 | Kroyer et al. ............ 19/304 |
| 4,509,215 A | 4/1985 | Paz |
| 4,553,969 A | 11/1985 | Taylor |
| 4,620,999 A | 11/1986 | Holmes ................... 428/35 |
| 4,640,810 A | 2/1987 | Laursen et al. ........... 264/518 |
| 4,681,574 A | 7/1987 | Eastman |
| 4,720,880 A | 1/1988 | Barreau |
| 4,734,941 A | 4/1988 | DeWitt et al. ............ 4/144.4 |
| 4,759,086 A | 7/1988 | Booth-Cox |
| 4,762,738 A | 8/1988 | Keyes et al. |
| 4,826,493 A | 5/1989 | Martini et al. ........... 604/327 |
| 4,827,540 A | 5/1989 | Stokes |
| 4,830,187 A | 5/1989 | Keyes et al. |
| 4,868,024 A | 9/1989 | Cross et al. |
| 4,882,794 A | 11/1989 | Stewart, III ................ 4/451 |
| 4,908,025 A | 3/1990 | Ketchum, Jr. |
| 4,930,942 A | 6/1990 | Keyes et al. |
| 4,946,720 A | 8/1990 | Oishi et al. |
| 4,990,145 A | 2/1991 | Fleury |
| 4,996,727 A | 3/1991 | Wyatt |
| 5,009,647 A | 4/1991 | Cross et al. |
| 5,009,648 A | 4/1991 | Aronoff et al. |
| 5,048,589 A | 9/1991 | Cook et al. ............ 162/109 |
| 5,108,382 A | 4/1992 | Wright et al. ............ 604/342 |
| 5,116,139 A | 5/1992 | Young et al. |
| 5,135,519 A | 8/1992 | Helmer |
| 5,158,810 A | 10/1992 | Oishi et al. |
| 5,190,533 A | 3/1993 | Blackburn |
| 5,283,090 A | 2/1994 | Umemura |
| 5,300,358 A | 4/1994 | Evers ..................... 428/286 |
| 5,312,883 A | 5/1994 | Komatsu et al. ....... 526/318.44 |
| 5,354,132 A | 10/1994 | Young et al. |
| 5,356,398 A | 10/1994 | Willis |
| 5,380,309 A | 1/1995 | Keyes et al. |
| 5,394,571 A | 3/1995 | Vernon |
| 5,423,782 A | 6/1995 | Wolrich |
| D363,343 S | 10/1995 | Azimi-Bolourian |
| 5,455,972 A | 10/1995 | Williams |
| 5,468,526 A | 11/1995 | Allen et al. |
| 5,472,518 A | 12/1995 | Patnode et al. |
| 5,508,101 A | 4/1996 | Patnode et al. ........... 428/286 |
| 5,509,913 A | 4/1996 | Yeo |
| 5,527,171 A | 6/1996 | Soerensen ............... 425/83.1 |
| 5,564,136 A | 10/1996 | Cox |
| 5,567,510 A | 10/1996 | Patnode et al. |
| 5,607,551 A | 3/1997 | Farrington, Jr. et al. ..... 162/109 |
| 5,611,092 A | 3/1997 | Van Dusen |
| 5,630,972 A | 5/1997 | Patnode et al. |
| 5,650,219 A | 7/1997 | Honeycutt |
| 5,674,578 A | 10/1997 | Giori ..................... 428/35.4 |
| 5,681,299 A | 10/1997 | Brown ................... 604/364 |
| 5,729,956 A | 3/1998 | McGlothlin |
| 5,763,065 A | 6/1998 | Patnode et al. |
| 5,769,831 A | 6/1998 | Freeman et al. |
| 5,778,458 A | 7/1998 | Speelman |
| 5,779,860 A | 7/1998 | Hollenberg et al. |
| 5,798,152 A | 8/1998 | Stevens |
| 5,847,983 A | 12/1998 | Uya |
| 5,871,679 A | 2/1999 | Honeycutt |
| 5,938,647 A | 8/1999 | Smith |
| 5,952,433 A | 9/1999 | Wang et al. .............. 525/415 |
| 5,960,740 A | 10/1999 | Pelsor |
| 5,976,694 A | 11/1999 | Tsai et al. ............... 428/373 |
| 5,981,012 A | 11/1999 | Pomplun et al. |
| 6,000,078 A | 12/1999 | Stefano |
| 6,020,425 A | 2/2000 | Wang et al. .............. 525/56 |
| 6,075,118 A | 6/2000 | Wang et al. .............. 528/354 |
| 6,075,179 A | 6/2000 | McCormack et al. ...... 604/367 |
| 6,100,330 A | 8/2000 | Wang et al. |
| 6,103,809 A | 8/2000 | Ahmed et al. |
| 6,111,014 A | 8/2000 | Wang et al. |
| 6,114,024 A | 9/2000 | Forte .................... 428/315.9 |
| 6,116,780 A | 9/2000 | Young et al. |
| 6,121,170 A | 9/2000 | Tsai et al. ............... 442/220 |
| 6,146,568 A | 11/2000 | Tanner et al. |
| 6,187,696 B1 | 2/2001 | Lim et al. ................ 442/77 |
| 6,199,220 B1 | 3/2001 | Smith |
| 6,258,427 B1 | 7/2001 | Kerins et al. ............. 428/41.8 |
| 6,270,875 B1 | 8/2001 | Nissing .................. 428/138 |
| 6,299,606 B1 | 10/2001 | Young |
| 6,324,704 B1 | 12/2001 | Imo |
| 6,345,911 B1 | 2/2002 | Young et al. |
| 6,514,602 B1 * | 2/2003 | Zhao et al. ............... 428/212 |
| 6,554,810 B1 | 4/2003 | Wilk et al. |
| 2003/0116575 | 6/2003 | Ellingson et al. |
| 2003/0121097 | 7/2003 | Sherrod et al. |

FOREIGN PATENT DOCUMENTS

| | | | |
|---|---|---|---|
| DE | 2 211 880 | 9/1973 | |
| DE | 2 255 323 | 5/1974 | |
| DE | 24 57 093 | 6/1975 | |
| DE | 35 39 893 A1 | 11/1986 | |
| DE | 200 16 916 | 1/2001 | |
| EP | 0 296 143 A1 | 12/1988 | |
| EP | 0 371 622 A1 | 6/1990 | |
| EP | 0 518 519 B1 | 12/1992 | |
| EP | 0 589 437 B1 | 3/1994 | |
| EP | 0 591 450 B1 | 4/1994 | |
| EP | 0 703 762 B1 | 4/1996 | |
| EP | 0 726 068 B1 | 8/1996 | |
| EP | 0 773 766 B1 | 5/1997 | |
| EP | 0 821 925 A1 | 2/1998 | |
| EP | 0 723 859 | 8/1999 | ........ B32B/27/08 |
| EP | 0 773 764 | 5/2000 | |
| FR | 2 539 985 A1 | 3/1984 | |
| FR | 2 653 652 A1 | 5/1991 | |

| | | | | | |
|---|---|---|---|---|---|
| GB | 898903 | 6/1962 | WO | 97/02375 | 1/1997 |
| GB | 1 483 917 | 8/1977 | WO | WO 97/37903 A1 | 10/1997 |
| GB | 2 193 925 A | 2/1988 | WO | 98/29502 | 7/1998 |
| GB | 2 204 236 A | 11/1988 | WO | 98/29506 | 7/1998 |
| GB | 8724609.6 | 6/1989 | WO | 98/29517 | 7/1998 |
| GB | 2 349 898 A | 11/2000 | WO | WO 98/46668 A1 | 10/1998 |
| JP | 9-154769 | 6/1997 | WO | 98/48684 | 11/1998 |
| JP | 10-57274 | 3/1998 | WO | 98/50611 | 11/1998 |
| WO | 86/01098 | 2/1986 | WO | 99/06456 | 2/1999 |
| WO | WO 86/04222 A1 | 7/1986 | WO | 99/45834 | 9/1999 |
| WO | 94/25189 | 11/1994 | WO | WO 99/49770 A1 | 10/1999 |
| WO | WO 95/24853 A1 | 9/1995 | WO | 99/65981 | 12/1999 |
| WO | 96/01089 | 1/1996 | WO | WO 00/36217 A1 | 6/2000 |
| WO | 96/01090 | 1/1996 | WO | 00/59427 | 10/2000 |
| WO | 96/20831 | 7/1996 | | | |
| WO | 96/21057 | 7/1996 | | | |
| WO | 96/37171 | 11/1996 | | | |

* cited by examiner

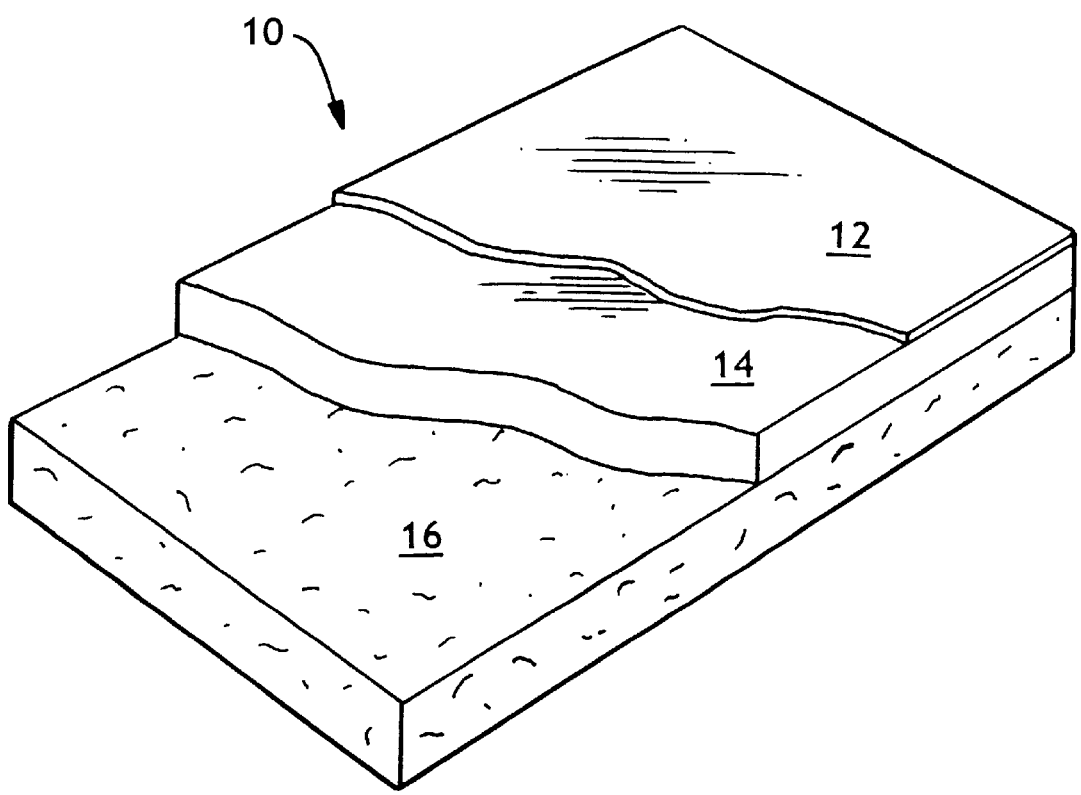

LATENTLY DISPERSIBLE BARRIER COMPOSITE MATERIAL

RELATED APPLICATION

This application is one of two related applications filed on the same day. The other application is entitled "Flushable Commode Liner" with inventors John E. Kerins, Earle H. Sherrod, Ann L. McCormack, and Richard L. Shick, application Ser. No. 10/027,279, filed Dec. 21, 2001, incorporated herein by reference.

BACKGROUND

For numerous applications it is desired to contain and/or temporarily prevent passage of aqueous waste or other aqueous materials and at some later time dispose of the barrier material in a clean and environmentally friendly manner. To be effective, the material used to temporarily prevent passage must provide a barrier to leakage and at the appropriate time desirably break up into components that facilitate suitable disposal while minimizing adverse effects on the environment. Uses for such latently separable barrier materials include bags or other containers for biological waste, agricultural mats of various kinds, and disposable items like single use beverage containers and the like. Prior attempts to provide such materials have included laminates of film barriers with water sensitive layers of, for example, polyvinyl alcohol. In use, the barrier contacts the liquid contents and prevents passage until the water sensitive layer is exposed to an aqueous environment. At that point the water sensitive layer dissolves, breaks up or otherwise separates to facilitate disposal. Disposal by flushing in conventional toilets is possible with some of these combinations. Difficulties have been identified with these prior materials because many water sensitive materials like polyvinyl alcohol become dimensionally unstable when exposed to conditions of moderate to high humidity and tend to weaken or stretch. In use as a container, for example, the material can stretch out of shape and/or weaken to the point of rupture. Attempts to add stability by increasing the barrier film thickness, for example, add unacceptable cost and/or increase the issues to be addressed upon disposal. The thicker films have a greater tendency to remain intact on flushing, for example, and clog toilets or downstream systems. The need continues, therefore, for a temporary barrier, latently dispersible material that is stable under use conditions but also easily disposable under aqueous conditions as by flushing, for example. The present invention addresses this and similar needs.

SUMMARY OF THE INVENTION

The present invention includes a latently dispersible barrier composite using a low strength barrier layer of water insoluble composition combined with a water sensitive, low strength carrier and on the opposing side of the carrier an inextensible, dispersible support layer. The layers are bonded and provide a barrier to aqueous liquid contact from one side but the combination disperses when contacted by aqueous liquid from the other side. In use as a container, cover, or the like, convenient and environmentally sensitive disposal may be achieved. Examples of barrier layers include films or fine fibers of very lightweight construction using polymers such as polylactic acid or polycaprolactone. Examples of water sensitive carrier webs include films of polyvinyl alcohol with or without other components. Examples of inextensible support materials include higher modulus or low stretch toilet tissue grades.

Where all component layers are biodegradable and/or dispersible, disposal is facilitated. For many applications it will be desirable to maintain component layers as light or low basis weight as is compatible with the intended use. In particular, the barrier layer may not be readily dispersible if it is of increased thickness. Cost will provide an incentive to reduce the weight of the component layers, particularly for single use applications. Many such applications will use a barrier layer of polylactic acid having a thickness in the range of from about 0.5 to about 2.0 microns, polyvinyl alcohol film carrier layer having a thickness in the range of from about 10 to about 50 microns, and a tissue support layer in the range of from about 10 to about 30 gsm, for example. As a result the composite will desirably have a hydrohead property of at least about 15 mbar, for some applications at least about 25 mbar, for more demanding applications at least about 50 mbar, and in some cases at least about 75 mbar. Bonding of the layers may be by a variety of means that preserve desired properties, including thermal (such as coextrusion or extrusion coating, for example) and adhesive, pattern and smooth bonding means.

DEFINITIONS

As used herein unless the context requires a different meaning, the following terms have the meanings set forth below:

As used herein and in the claims, the term "comprising" is inclusive or open-ended and does not exclude additional unrecited elements, compositional components, or method steps.

As used herein the term "nonwoven fabric or web" means a web having a structure of individual fibers or threads which are interlaid, but not in an identifiable manner as in a knitted fabric. Nonwoven fabrics or webs have been formed from many processes such as for example, meltblowing processes, spunbonding processes, and bonded carded web processes. The basis weight of nonwoven fabrics is usually expressed in ounces of material per square yard (osy) or grams per square meter (gsm) and the fiber diameters useful are usually expressed in microns. (Note that to convert from osy to gsm, multiply osy by 33.91).

As used herein the term "meltblown fibers" means fibers formed by extruding a molten thermoplastic material through a plurality of fine, usually circular, die capillaries as molten threads or filaments into converging high velocity, usually hot, gas (e.g. air) streams which attenuate the filaments of molten thermoplastic material to reduce their diameter, which may be to microfiber diameter. Thereafter, the meltblown fibers are carried by the high velocity gas stream and are deposited on a collecting surface to form a web of randomly dispersed meltblown fibers. Such a process is disclosed, for example, in U.S. Pat. No. 3,849,241 to Butin et al. Meltblown fibers are microfibers that may be continuous or discontinuous, are generally smaller than 10 microns in average diameter, and are generally tacky when deposited onto a collecting surface.

"Bonded carded web" refers to webs made from staple fibers which are sent through a combing or carding unit, which breaks apart and aligns the staple fibers in the machine direction to form a generally machine direction-oriented fibrous nonwoven web. Such fibers are usually purchased in bales that are placed in a picker that separates the fibers prior to the carding unit. Once the web is formed, it then is bonded by one or more of several known bonding methods. One such bonding method is powder bonding, wherein a powdered adhesive is distributed through the web and then activated, usually by heating the web and adhesive with hot air. Another suitable bonding method is pattern bonding, wherein heated calender rolls or ultrasonic bonding equipment are used to bond the fibers together, usually in a localized bond pattern, though the web can be bonded across its entire surface if so desired. Another suitable and well-known bonding method, particularly when using bicomponent staple fibers, is through-air bonding.

"Airlaying" is a well-known process by which a fibrous nonwoven layer can be formed. In the airlaying process, bundles of small fibers having typical lengths ranging from about 6 to about 19 millimeters (mm) are separated and entrained in an air supply and then deposited onto a forming screen, usually with the assistance of a vacuum supply. The randomly deposited fibers then are bonded to one another using, for example, hot air or a spray adhesive. Examples of airlaying technology can be found in U.S. Pat. Nos. 4,494,278, 5,527,171, 3,375,448 and 4,640,810.

As used herein, through-air bonding or "TAB" means a process of bonding a nonwoven web containing adhesive polymeric component fibers, particles or the like in which air sufficiently hot to melt one of the polymers of which the fibers or particles of the web are made is forced through the web. The air velocity often is between 100 and 500 feet per minute and the dwell time may be as long as 6 seconds. The melting and resolidification of the polymer provides the bonding. Through air bonding has relatively restricted variability and since through-air bonding (TAB) requires the melting of at least one component to accomplish bonding, it is restricted to webs with two components like conjugate fibers or those which include an adhesive. In the through-air bonder, air having a temperature above the melting temperature of one component and below the melting temperature of another component is directed from a surrounding hood, through the web, and into a perforated roller supporting the web. Alternatively, the through-air bonder may be a flat arrangement wherein the air is directed vertically onto the web. The operating conditions of the two configurations are similar, the primary difference being the geometry of the web during bonding. The hot air melts the lower melting polymer component and thereby forms bonds between the filaments to integrate the web.

As used herein, the term "flushable" means that an item may be successfully transported through a toilet and through the typical municipal sewerage system piping and pumps without incident (i.e. clogging).

As used herein, the term "water dispersible" refers to structures which when placed in an aqueous environment will, with sufficient time, break apart into smaller pieces. As a result, the structure once dispersed may be more advantageously processable in recycling processes or flushable in, for example, septic and municipal sewage treatment systems. If desired, such structures may be made more water dispersible or the dispersion may be hastened by the use of agitation and/or certain triggering means. The actual amount of time will depend at least in part upon the particular end-use design criteria.

As used herein, the term "biodegradable" means that a material degrades from the action of naturally occurring microorganisms such as bacteria, fungi and algae.

As used herein, the term "tissue" includes not only inextensible, dispersible cellulose based tissue products, but other nonwoven webs having the described properties such as meltblown webs of meltblown PVOH fibers, for example. The manufacture of tissue grades of varying extensibility is well-known and may be obtained by conventional steps such as creping or wet microcontraction as more fully described, for example, in U.S. Pat. No. 6,270,875 incorporated herein in its entirety by reference. It includes layers that may become saturated and/or allow liquid to pass through, sometimes referred to as "saturation layer".

As used herein, the term "water sensitive" means a structure or layer that loses integrity in contact with water as by means of breaking up or dissolving, for example, but which maintains effective strength for the desired application.

As used herein, the term "water soluble" means dissolves into water as a homogeneous solution.

As used herein, the term "inextensible" means having machine direction stretch of less than 15%. The following parameters may be used: crosshead speed: 10.0 in/min (254 mm/min), full scale load: 10 lb (4,540 g.), jaw span (the distance between the jaws, sometimes referred to as the gauge length): 2.0 inches (50.8 mm), specimen width: 3 inches (76.2 mm). The testing device may be a Sintech, Model CITS-2000 (Systems Integration Technology Inc. Stoughton, Mass.—a division of MTS Systems Corporation, Research Triangle Park, N.C.).

TEST PROCEDURES

Tensile: As used herein, dry CD tensile strengths represent the peak load per sample width when a sample is pulled to rupture in the cross-machine direction. The sample must be dry and have been conditioned at 73.4±3.6° F., 50±5% relative humidity for at least 4 hours prior to testing. Samples are prepared by cutting a 3-inch wide×6-inch long strip in the cross-machine direction (CD) orientation. The instrument used for measuring tensile strengths is an MTS Systems Synergie 100. The data acquisition software was MTS TestWorks® 3.10 (MTS Systems Corp., Research Triangle Park, N.C.). The load cell is selected from either a 50 Newton or 100 Newton maximum, depending on the strength of the sample being tested, such that the majority of peak load values fall between 10–90% of the load cell's full scale value. The gauge length between jaws is 4+/−0.04 inches. The jaws are operated using pneumatic-action and are rubber coated. The minimum grip face width is 3 inches and the approximate height of the grip face of the jaw is 1.0 inch. The crosshead speed is 10+/−0.4 inches/min. The sample is placed in the jaws of the instrument, centered both vertically and horizontally. The test is then started and ends when the specimen breaks. The peak load is recorded as the "CD dry tensile strength" of the specimen. Five (5) representative specimens are tested for each product and the arithmetic average of all five individual specimen tests is the CD tensile strength for the product.

Wet tensile strength measurements are measured in the same manner, but after the center portion of the previously conditioned sample strip has been saturated with distilled water immediately prior to loading the specimen into the tensile test equipment. Sample wetting is performed by first laying a single test strip onto a piece of blotter paper (Fiber Mark, Reliance Basis 120). A pad is then used to wet the sample strip prior to testing. The pad is a green, Scotch-Brite brand (3M) general-purpose commercial scrubbing pad. To prepare the pad for testing, a full-size pad is cut approximately 2.5 inches long by 4 inches wide. A piece of masking tape is wrapped around one of the 4-inch long edges. The taped side then becomes the "top" edge of the wetting pad. To wet a tensile strip, the tester holds the top edge of the pad and dips the bottom edge in approximately 0.25 inches of distilled water located in a wetting pan. After the end of the pad has been saturated with water, the pad is then taken from the wetting pan and the excess water is removed from the pad by lightly tapping the wet edge three times across a wire mesh screen. The wet edge of the pad is then gently placed across the sample, parallel to the width of the sample, in the approximate center of the sample strip. The pad is held in place for approximately one second and then removed and placed back into the wetting pan. The wet sample is then immediately inserted into the tensile grips so the wetted area is approximately centered between the upper and lower grips. The test strip should be centered both horizontally and vertically between the grips. (It should be noted that if any of the wetted portion comes into contact with the grip faces, the specimen must be discarded and the jaws dried off before resuming testing.) The tensile test is then performed and the peak load recorded as the CD wet tensile strength of this specimen. As with the dry CD tensile test, the characterization of a product is determined by the average of five representative sample measurements. MD results may be obtained by cutting and loading the samples in the MD direction.

MD Extensibility: is the stretch at peak load defined as the elongation of a specimen at the point at which it generates its peak load divided by the gauge length expressed as a percent.

Modulus: A measure of stiffness of a web as determined by Max Slope which is the maximum slope of the machine direction load/elongation curve for the web. The tensile tester program should be set up such that five hundred points such as P1 and P2 are taken over a two and one-half inch (63.5 mm) span of elongation. This provides a sufficient number of points to exceed essentially any practical elongation of the specimen. With a ten inch per minute (254 mm/min) crosshead speed, this translates into a point every 0.030 seconds. The program calculates slopes among these points by setting the 10th point as the initial point (for example P1), counting thirty points to the $40^{th}$ point (for example, P2) and performing a linear regression on those thirty points. It stores the slope from this regression in an array. The program then counts up ten points to the $20^{th}$ point (which becomes P1) and repeats the procedure again (counting thirty points to what would be the $50^{th}$ point (which becomes P2), calculating that slope and also storing it in the array). This process continues for the entire elongation of the sheet. The Max Slope is then chosen as the highest value from this array. The units of Max Slope are kg per three-inch specimen width. (Strain is , of course, dimensionless since the length of elongation is divided by the length of the jaw span. This calculation is taken into account by the testing machine program.)

Hydrohead: A measure of the liquid barrier properties of a fabric is the hydrohead test. The hydrohead test determines the millibars of water pressure that the fabric will support before a predetermined amount of liquid passes through. A fabric with a higher hydrohead reading indicates it has a greater barrier to liquid penetration than a fabric with a lower hydrohead. The hydrohead test is performed according to Federal Test Standard 191A, Method 5514 except that no support was used, and the measure was taken at the first drop of penetration.

Flushability Testing
Materials
A 312 $in^2$ flushable commode liner fabricated by sealing two halves in trapezoid shape with a long side of 24 inches and a short side of 3.5 inches to form a bag open at the long side.

Saline (300 ml per test)
Toilet Paper (10 standard commercial grade sheets per test)
1.6 gallon standard flush toilet having a water surface about 12 inches×10 inches with a minimum ball pass diameter of 2 inches (ANSI AI12.19.2, 1973). The siphoning trapway is located at the rear of the bowl and flushing water is provided by a gravity discharge tank. Dimensions are about 4 inch diameter for discharge outlet at the bottom of the bowl, which is also the entrance to the trapway, and the diameter of the trapway itself, at around 2.5 inches.

A simulated lateral system was constructed using clear plastic pipe in a zigzag run connected to the toilet. The diameter of the pipe is four inches, with an overall run length of about 45 feet and a downward slope of about ¼" per foot. The pipes wind around in a rectangular pattern, like the winding of multiple flights in rectangular stair well or like the coils in a square spring. A four-foot run from under the toilet turns 90 degrees at an elbow, then a 3-foot run of pipe, another 90-degree elbow, a 10 foot run, a 90-degree elbow, a 3-foot run, a 90-degree elbow, a 10-foot run, a 90-degree elbow, a 3-foot run, a 90-degree elbow, and a final 10-foot run before a final turn and outlet onto a screen (4-e-3-e-10-e-3-e-10-e-3-e-10-turn to outlet).

Procedure
1. Pour 300 ml of saline into commode liner
2. Place 10 sheets of toilet paper into liner
3. Drop filled commode liner into 1.6-gallon toilet
4. Allow approximately 10 seconds for commode liner to sink to bottom of bowl
5. Flush Toilet
6. Observe that commode liner passes through lateral piping system and does not become clogged.

Pass Criteria
The commode liner is considered flushable if the commode liner flushes in 2 flushes or less, nine out of ten times. The commode liner must also pass through the lateral piping system without clogging. The commode liner need not pass through the lateral piping system in only 2 flushes but must show continued movement down the lateral system with each flush, and eventually reach the outlet.

Dispersibility
Commode liners were flushed and then observed as they were put through a municipal sewage-treatment transport simulator. The simulator is a tank of about 30 gallons of water with recirculating pumps to mimic hydraulic flow rates of about two feet per second, which are comparable to general conditions seen in travel through the sewer line to a sewage treatment plant. After ninety minutes the simulator was drained of water through a screened outlet, and any sections caught on the screen were recovered. These sections were then measured to determine their total mass. The total area of a commode liner is 312 $in^2$, and it is considered dispersed if no more than about 30%, desirably no more than about 25%, and more desirably no more than about 15% of the original barrier layer mass is left. Ninety minutes is considered the minimum travel time from the home to the treatment facility.

Materials
Standard 312 $in^2$ commode liner
1.6 gallon toilet as described above.
Lateral piping system as described above
Transport Simulator: as described.
Ruler Procedure
1. Fill transport simulator with water up to fill line
2. Turn transport simulator on 3. Set lateral piping valve to pass on to transport simulator
4. Drop commode liner into 1.6-gallon toilet (saline and toilet tissue are included)
5. Flush toilet and observe as commode liner passes through lateral piping
6. The commode will then drop into the transport simulator
7. Allow commode liner to circulate for 90 minutes
8. Turn off simulator
9. Remove undissolved sections of PLA that are visible or floating. Be careful not to damage the sections and keep them separate from one another to avoid sticking.
10. Drain out water
11. Remove remaining pieces of PLA.
12. Unravel PLA pieces (drying is optional)
13. Record areas of PLA pieces and mass based on area determination and multiplying by prewet basis weight.
14. Clean up circular transport tester

BRIEF DESCRIPTION OF THE DRAWING

The FIGURE illustrates one embodiment of the composite of the invention as a two layer film and a support tissue layer.

DETAILED DESCRIPTION

One embodiment of the invention finds use as a commode liner. One basic form of a disposable commode liner is a "plastic bag". A desirable implementation as a flushable commode liner utilizes an impermeable substrate ("plastic bag") which contains body wastes, but which can be transferred from the commode and flushed down the toilet. Many other uses will be apparent to those of skill in the art, including, without limitation, emesis basin liners, pet excrement containers, bedpan liners, medical waste containers, colostomy bags, toilet seat liners, medical drapes and garments, hospital or nursing home bed liners, bandages. In other areas, beverage containers, agricultural tapes and seed fabrics as well as laundry and dishwashing detergent containers may be made from the composites of the present invention.

The composite of the invention is particularly useful for those applications necessitating a barrier to liquid flow in one direction but readily dispersible by liquid flow or contact in the opposite direction. One embodiment of the invention finds use as a waste containment bag, for example, a commode liner. A desirable implementation as a flushable commode liner utilizes an impermeable substrate ("plastic bag") which contains body wastes, but which can be transferred from the commode and flushed down the toilet. Other uses such as disposable beverage containers, bath mats, shower caps, and the like will be apparent to those skilled in the art.

The key features of the impermeable substrate in-use are a minimum level of integrity so the product can be handled in use, for example, the waste bag can be removed from the commode without bursting or stretching to the point of rupture, and a barrier function defined by the hydrohead values of at least about 15 mbar, about 25 mbar, about 50 mbar or about 75 mbar as appropriate to the intended use so the bag or product contains the waste over an extended period of time. The impermeable composite for many applications needs to have sufficient wet flexibility, so the product easily conforms and goes down the toilet, if flushed, and dispersibility, so the film is acceptable for septic or municipal sewage treatment systems.

A coextruded bilayer film coated onto or otherwise bonded to a stabilizing, inextensible, but highly dispersible layer of, for example, tissue, has been developed in accordance with the invention to manage the balance of in-use integrity (strength and barrier) and flushability (wet flexibility and dispersibility). The base layer in the film may be a water-soluble poly(vinyl alcohol) blend adhered to the tissue layer, with the tissue forming one exposed layer of the liner, while the second, exposed layer may be thin, low strength, fluid-impervious, preferably water insoluble and biodegradable layer, which lines the inside of the product in, for example, a container embodiment. The PVOH/tissue layers provide strength prior to disposal, so the product and contents can be carried to the toilet or other aqueous disposal area. In the toilet, the PVOH and tissue dissolve or disperse, leaving only the very thin barrier layer and the body or other type of waste to move down the toilet. The thin barrier layer must have enough impermeability to contain the waste when supported by the dry PVOH/tissue layers; after clearing the toilet, the thin layer desirably will break up to avoid clogging in the pipes. The biodegradable nature of the barrier layer ensures a safe treatment and breakdown of the barrier remnants when they reach the wastewater treatment plant or septic system. It is also desired for certain applications that the barrier layer be maintained thin so as to avoid imparting excessive wet tensile properties to the composite of, for example, no more than 2000 g of wet tensile peak load and in some applications, no more than 1000 g. Examples of barrier film materials in addition to PLA include copolyesters such as Eastar Bio GP products from Eastman, polycaprolactone such as Tone P767 from Union Carbide Corporation, 39 Old Ridgebury Road, Danbury, Conn., a polybutylene succinate polymer or a polybutylene succinate-co-adipate polymer or a mixture of such polymers, polypropylene oxide, cold-water insoluble PVOH, polyvinyl alcohol copolymers, gelatinized starch, nylon copolymers, acrylic acid copolymers, other copolymers of and blends of any of the foregoing. For specific examples, reference is directed to WO 96/20831 to Larson et al., incorporated herein in its entirety by reference. Desirable applications will include a barrier layer thickness of up to 5 microns and, in many cases, up to only about 2 microns.

Various polymers can be used for the thin barrier layer component which, advantageously, is formed by coextrusion with the water sensitive, for example, PVOH, layer. As previously mentioned, PLA is ideally suited as a barrier layer, but other polymers may be used, such as polyolefins and the others previously identified. PLA and other biodegradable resins are preferred for environmental reasons.

The water responsive (water sensitive) layer of the present invention includes compositions of selectively water-responsive polymer blends. These water-responsive polymer blends may be constructed from water-soluble and hydrolytically degradable polymers including polyethylene oxide (PEO) and polyvinyl alcohol (PVOH)). Cold-water soluble polyvinyl alcohol (PVOH) of partially hydrolyzed polyvinyl acetate is desired for the compositions of the present invention and typically the hydrolysis level is between approximately 70% and 85%. The term "hydrolysis level" as used herein, is defined as the percentage of vinyl acetate units in polyvinyl acetate which are hydrolyzed into vinyl alcohol units in the polyvinyl alcohol. Depending upon the purpose and use of an article, compositions comprising different components of variable water sensitivity may be desired. Controlling water-responsiveness is necessary for different components in certain products due to the location of use in relation to body or other waste. The thickness of the water responsive layer will depend on the desired use and will frequently be in the range of from about 10 microns to about 50 microns and, for some applications, in the range of from about 15 microns to about 45 microns.

Generally, manufacturers of polymers utilizing standard processes convert raw material monomers into polymer beads, resins or other pelletized or powdered products, which are commercially available from companies such as Aldrich (Milwaukee, Wis.), Dow Chemical (Midland, Mich.), DuPont Company (Wilmington, Del.), Exxon (Baytown, Tex.), Nippon Goshei (Japan) and Union Carbide Corporation (Danbury, Conn.). The polymer in this form may then be used in processes such as extruding blow-molding, casting films, blowing films, thermoforming, injection molding or fiber spinning at elevated temperatures, for example, to form useful articles. The above processes are collectively referred to as melt processing. Polymers produced by processes that are to be provided commercially as beads, resins powders or other non-finished solid forms are generally referred to collectively as polymer resins.

PLA resins produced by different synthetic methods such as ring-opening polymerization of lactide or direct condensation polymerization from lactic acid are particularly useful for the compositions used for the thin film component in the present invention. PLA (MW=133,900, Viscosity at 1000 (1/s) of 331, melt temperature 169° C., relative viscosity 2-8-3.4 and % D less than or equal to 1.4) purchased from Cargill-Dow as Grade 6200D, may be used, for example. Also exemplary types of resins include various grades from Cargill, Incorporated as are described in WO 98/50611, incorporated herein by reference in its entirety. In addition, thin barrier meltblown layers are contemplated as are also described in WO 98/50611. As stated, the barrier layer, depending on the polymer and use, may have a thickness of about 2 microns or below for economy and ease of disposal. Cold water dispersible PVOH (Gohsenol KP08, KP06, and KP05, purchased from Nippon Gohsei, Japan) are also an exemplary of types of useful resins as are various grades of Evanol 40-05 PVOH from duPont, Wilimington, Del.

The barrier and water-sensitive polymer film compositions according to the present invention are desirably produced by a melt layering process. It is desired according to the present invention to coextrude the two components in an extruder, such as a single-screw or twin-screw extruder under appropriate temperature and shear/pressure conditions to ensure bonding. Useful processes are described, for example, in coassigned U.S. Pat. Nos. 6,075,179 to McCormack and Hetzler issued Jun. 13, 2000 and 6,114,024 to Forte issued Sep. 5, 2000, each incorporated herein by reference in its entirety. The process can also be performed in a batchwise device, such as a melt mixer or a kneader. PLA or PVOH can be fed into the coextruder either in a single or multimanifold die configuration.

The preferred water sensitive layer is a film of PVOH. The present invention also contemplates as the water sensitive layer layers of selectively water-responsive homogeneous polymer blend compositions comprising a water sensitive polymer blend such as PVOH and anhydride-modified ethylene vinyl acetate available, for example, from du Pont under the trademark BYNEL® for modulus reduction. The term "homogeneous polymer blend composition", as used herein, means that the polymer blend forms a cohesive, continuous structure of anhydride-modified ethylene vinyl acetate and polyvinyl alcohol. A homogeneous polymer blend composition can be achieved by the mixing of polyvinyl alcohol and modified EVA at temperatures above the melting point of the polymer having the highest melting point, and below the decomposition point of the polymer having the lowest decomposition point, in order to form a homogeneous molten mixture of the polymers (prior to cooling to solid form, e.g. films or fibers). For homogeneous polymer blend compositions of modified EVA and polyvinyl alcohol, the polymer having the higher melting point is polyvinyl alcohol and the polymer having the lower decomposition point is also polyvinyl alcohol. The melting point for polyvinyl alcohol is generally approximately between 180–190° C., and more specifically around 183° C. The decomposition point of polyvinyl alcohol is above approximately 200° C. The resulting composition resembles islands of modified EVA in a sea of polyvinyl alcohol, for example, and at a microscopic level has the appearance of approximately uniform distribution of modified EVA in polyvinyl alcohol. The homogeneous polymer blend composition of the present invention therefore has very fine dispersion of modified EVA within polyvinyl alcohol. The homogeneous polymer blend composition, therefore, is formed prior to the polymers being formed into films or nonwovens, resulting in compositions of polymers which are highly, and intimately interconnected, having a selectively uniform dispersion. Such compositions are distinguishable from those comprising blended polymers that consist of polymers which are blended after they have been formed into fibers or films, resulting in compositions which do not have approximate uniform dispersion and often appearing as individual polymers layered or mixed together. Summarily, when individual polymers are mixed at temperatures above the melting point of the polymer having the highest melting point, and below the decomposition point of the polymer having the lowest decomposition point, an approximately uniform distribution and dispersion of polymers results. In contrast, when individual polymers are mixed according to standard practices, a blended polymer composition results wherein the polymers are not as integrally associated. The water-sensitivity of the polymer compositions may be controlled according to the degree of the homogeneity of the polymer blends.

Turning to the FIGURE, the composite is illustrated in perspective and partial cross-section, although not to scale because of the extremely thin barrier film layer. As shown, composite 10 comprises barrier film layer 12, water dispersible film layer 14 and inextensible support layer 16.

One embodiment of a water sensitive layer useful in accordance with the present invention is a homogeneous polymer blend composition comprising approximately 1–35% modified EVA and approximately 65–99% polyvinyl alcohol, wherein such composition is water-dispersible.

The compositions described may be formed into polymer films. Alternatively, nonwoven webs such as spunbonded webs, airlaid webs, bonded carded webs, and meltblown webs may be formed satisfying the above criteria for barrier, water sensitive and inextensible components. In particular, barrier layers of fine meltblown PLA fibers and water sensitive layers of meltblown PVOH fibers are contemplated for use in accordance with the invention.

Requirements for the inextensible, water dispersible layer are that it provide sufficient strength and stability for the intended use and that it disperse or dissolve in contact with aqueous liquid or otherwise allow water to permeate to the water sensitive layer. For applications such as commode liners or beverage containers, for example, it is important that the layer be relatively inextensible because stretching or sagging leads to fracture of the barrier layer and may result in leakage of the contents. In this regard, extensibility of the layer is desirably less than about 15% as measured by tensile testing and even more desirably less than about 12% or, for some applications, less than about 10%. This layer also desirably will have a modulus in the range of greater than about 10 as measured by max slope as described above and for some applications in the range of greater than 15 or for others greater than 20. Suitable layers are formed from low crepe (flat) bathroom tissue with no wet strength additive and having a basis weight in the range of from about 10 to about 30 gsm, for example. Traditional soft, creped tissue having extensibility outside these ranges has not provided the necessary stability. The combination with the barrier layer and water sensitive layer is desirably produced by coextrusion of a bilayer film onto the tissue but the layers may be interbonded by adhesive, thermal or other means consistent with obtaining the properties described. For many applications it is desirable for the barrier layer to be as thin as is practical consistent with manufacturing and functionality. For example a PLA film of thickness in the range of from about 0.5 micron to about 2 microns may be coextruded with a PVOH film having a thickness in the range of from about 10 microns to about 50 microns. For cost savings the total thickness is desirably within the range of from about 10 to about 30 microns for many applications. As will be appreciated, thicknesses may vary outside those ranges for certain applications. Desirably, the coextruded film is applied directly to the inextensible, water dispersible layer with the water-sensitive, for example, PVOH side in contact with the inextensible layer.

EXAMPLES

Example 1

A composite in accordance with the invention was produced using the following procedure: a 1.5 micron barrier layer of PLA (6200 PLA from Cargill-Dow) and an 18.8 micron water-sensitive PVOH (Evanol 40-05 from DuPont) layer were coextruded as a two layer cast film of 20.3 microns thickness using a single screw extruder and melt temperature ranging from about 280 to 380° F. for the PVOH containing layer and about 300 to 385° F. for the PLA layer. This two layer film was directly coextruded with the PVOH layer contacting a 13 gsm low extensible (12.5% MD extensibility, MD Max Slope of 20.8) tissue layer containing no wet strength additive, water dispersible tissue (City Forest Grade 4089) at a rate of about 274 fpm (1.39 m/sec).

Example 2

Example 1 was repeated except that the PLA barrier layer thickness was decreased to 1.3 microns and the water sensitive layer was an 80%/20% blend of PVA and modified EVA (Bynel 3860 from DuPont) having a thickness of 24.1 microns.

Comparative Example 1

Example 1 was repeated except that the coextruded film was reversed and the PLA layer contacted the tissue layer.

Comparative Example 2

Example 1 was repeated except that the thickness of the PLA layer in the coextruded film was 1.9 microns and the water sensitive layer was a blend of 80% PVOH (NK05 from Nippon) and 20% anhydride modified EVA (Bynel 3860 from DuPont). In addition, the tissue layer was 13 gsm high extensible (21% MD extensibility, MD Max Slope of 3.4) water dispersible tissue (available as Member's Mark brand toilet tissue from Sam's Club outlets).

Comparative Example 3

Example 1 was repeated except that the coextruded film was made up of a layer of PLA of 2.0 microns thickness and PVOH layer of 18.3 microns thickness.

Tensile, hydrohead and dispersibility testing of the above examples were carried out with the following results:

| Film/Tissue Laminate: | MD Tensile Peak Load mean (g) | CD Tensile Peak Load mean (g) | CD Wet Tensile Peak Load mean (g) | Hydrohead (mbar) | Dispersibility Mass* Remaining % | Dispersibility Recoverable Barrier Layer** Fragments % |
|---|---|---|---|---|---|---|
| Example 1 | 5627 | 3684 | 836 | 22.5 | 0.5 | 11 |
| Example 2 | 5936 | 4163 | 822 | 33.7 | 0.8 | 25 |
| Comparative 1 | 5955 | 5170 | 3933 | 12.0 | 4.3 | 93 |
| Comparative 2 | 10,000 | 6878 | 612 | 9.9 | 0.7 | 14 |
| Comparative 3 | 7378 | 6633 | 508 | 92.5 | 2.0 | 32 |

*based on entire laminate mass
**based on original barrier layer mass

Tensile results based on an average of five tests except for Example 1 hydrohead (1 test). Comparative 1 barrier and water sensitive layers remained substantially intact.

As shown, the composite of the present invention provides a unique combination of strength, hydrohead and dispersibility properties. Comparative Example 1 with the barrier layer melt extruded directly onto the tissue resulted in reinforcing the tissue and prevented it from being dispersed. Comparative Example 2 using an extensible support tissue characteristic of "soft" tissue allowed the fragile barrier layer to crack and fail thus imparting insufficient hydrohead properties. Comparative Example 3 with a thick barrier layer failed to disperse well.

It will be appreciated that the foregoing description, given for purposes of illustration, is not to be construed as limiting the scope of this invention, which is defined by the following claims and all equivalents thereto.

We claim:

1. A latently dispersible barrier composite having a wet tensile peak load of 2000 grams or less comprising:
    a. a barrier layer of water insoluble composition;
    b. a water sensitive layer facing one side of said barrier layer; and
    c. a water permeable, inextensible, dispersible tissue support layer facing the side of said water sensitive layer opposite from said barrier layer, wherein said layers are interbonded and said composite acts as a barrier to aqueous contact to said barrier layer and disperses on aqueous contact to said support layer.

2. The latently dispersible barrier composite of claim 1 wherein the barrier layer comprises a film having a thickness less than two microns.

3. The latently dispersible barrier composite of claim 2 wherein the barrier layer comprises polylactic acid.

4. The latently dispersible barrier composite of claim 2 wherein the water sensitive layer comprises polyvinyl alcohol.

5. The latently dispersible barrier composite of claim 1 wherein the water sensitive layer comprises polyvinyl alcohol.

6. The latently dispersible barrier composite of claim 5 wherein the water sensitive layer also comprises modified ethylene vinyl acetate blended with said polyvinyl alcohol.

7. The latently dispersible barrier composite of claim 1 having a hydrohead of at least 15 mbar.

8. The latently dispersible barrier composite of claim 7 having a CD wet tensile maximum load of about 1000 g.

9. The latently dispersible barrier composite of claim 7 having a hydrohead of at least 25 mbar.

10. The latently dispersible barrier composite of claim 9 having a hydrohead of at least 50 mbar.

11. The latently dispersible barrier composite of claim 10 having a water sensitive layer thickness within the range of from about 10 microns to about 50 microns.

12. The latently dispersible barrier composite of claim 9 having a water sensitive layer thickness within the range of from about 10 microns to about 50 microns.

13. The latently dispersible barrier composite of claim 7 wherein said tissue has an extensibility of less than about 15%.

14. The latently dispersible barrier composite of claim 1 wherein the water sensitive layer comprises polyethylene oxide.

15. The latently dispersible barrier composite of claim 1 wherein the barrier layer comprises a polymer selected from the group consisting of copolyesters, polycaprolactone, hydroxypropyl cellulose, polyvinyl pryidine, gelatinized starch, nylon copolymers, acrylic acid copolymers, and blends of the foregoing.

16. A latently dispersible and biodegradable composite comprising:

a. a low strength barrier layer having a thickness of less than about five microns and coextruded with, b. a water sensitive layer comprising a blend of polyvinyl alcohol and modified ethylene vinyl acetate having a thickness within the range of from about 10 to about 50 microns, and c. a support layer bonded to and facing said water sensitive layer, said support layer comprising tissue having an extensibility of less than about 15% and a basis weight in the range of from about 10 gsm to about 30 gsm, said composite having a hydrohead of at least about 25 mbar and CD wet tensile maximum load of less than about 2000 g.

* * * * *

UNITED STATES PATENT AND TRADEMARK OFFICE
CERTIFICATE OF CORRECTION

PATENT NO. : 6,713,140 B2  Page 1 of 1
DATED : March 30, 2004
INVENTOR(S) : McCormack et al.

It is certified that error appears in the above-identified patent and that said Letters Patent is hereby corrected as shown below:

Column 1,
Line 63, "acid or" should read -- acid (PLA) --

Column 6,
Line 31, "Flush Toilet" should read -- Flush toilet --

Column 7,
Line 9, "of PLA that" should read -- of barrier layer --
Line 13, "of PLA." should read -- of barrier layer. --
Line 14, "Unravel PLA" should read -- Unravel barrier layer --
Line 15, "areas of PLA" should read -- areas of barier layers --

Column 9,
Line 54, "layer layers" should read -- layer the use of layers --

Column 12,
Line 42, "results based" should read -- results are based --
Line 43, "Example 1 hydrohead (1 test)." should read -- Example 1 (1test). --

Signed and Sealed this

Thirty-first Day of August, 2004

JON W. DUDAS
*Director of the United States Patent and Trademark Office*